US012583339B2

(12) United States Patent
Ito et al.

(10) Patent No.: US 12,583,339 B2
(45) Date of Patent: Mar. 24, 2026

(54) INFORMATION PROCESSING APPARATUS AND INFORMATION PROCESSING SYSTEM

(71) Applicant: TOYOTA JIDOSHA KABUSHIKI KAISHA, Toyota (JP)

(72) Inventors: Masaki Ito, Toyota (JP); Akihiro Kusumoto, Susono (JP); Takahiro Hirano, Gotemba (JP); Ryunosuke Yamashita, Susono (JP); Daiki Tajima, Miyoshi (JP); Katsuya Kobayashi, Okazaki (JP); Toshihiro Nakamura, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 827 days.

(21) Appl. No.: 17/950,322

(22) Filed: Sep. 22, 2022

(65) Prior Publication Data

US 2023/0158899 A1     May 25, 2023

(30) Foreign Application Priority Data

Nov. 24, 2021     (JP) ................................. 2021-190164

(51) Int. Cl.
| | |
|---|---|
| *H02J 7/00* | (2006.01) |
| *B60L 53/10* | (2019.01) |
| *B60L 53/68* | (2019.01) |
| *G06V 40/16* | (2022.01) |

(52) U.S. Cl.
CPC .............. *B60L 53/10* (2019.02); *B60L 53/68* (2019.02); *G06V 40/178* (2022.01)

(58) Field of Classification Search
None
See application file for complete search history.

(56) References Cited

U.S. PATENT DOCUMENTS

| | | | | |
|---|---|---|---|---|
| 11,718,196 B2 * | 8/2023 | Lu | .......................... | G06Q 10/20 |
| | | | | 320/109 |
| 2010/0017249 A1 * | 1/2010 | Fincham | ................. | B60L 55/00 |
| | | | | 320/108 |
| 2012/0112698 A1 * | 5/2012 | Yoshimura | ............. | G06Q 30/06 |
| | | | | 320/109 |

FOREIGN PATENT DOCUMENTS

| | | |
|---|---|---|
| JP | 2013-026953 A | 2/2013 |

* cited by examiner

*Primary Examiner* — Arun C Williams
(74) *Attorney, Agent, or Firm* — Oliff PLC

(57) ABSTRACT

The first charging equipment is configured to charge the electric power storage device via contact charging using a charging cable. The second charging equipment is configured to charge the electric power storage device via non-contact charging. The server includes: a determination section that determines a non-contact charging recommendation degree representing a degree of recommendation of the non-contact charging method to the user, based on a characteristic of the user; and a setting section that sets suggested equipment that is charging equipment to be suggested to the user, of the first charging equipment and the second charging equipment. When the non-contact charging recommendation degree is high, the setting section is more likely to set the second charging equipment as the suggested equipment than when the non-contact charging recommendation degree is low.

5 Claims, 14 Drawing Sheets

| CHARGING EQUIPMENT ID | CHARGING METHOD | LOCATION |
|---|---|---|
| ST001 | NON-CONTACT | X1,Y1,Z1 |
| ST002 | NON-CONTACT | X2,Y2,Z2 |
| ST003 | NON-CONTACT | X3,Y3,Z3 |
| ST004 | CONTACT | X4,Y4,Z4 |
| ST005 | CONTACT | X5,Y5,Z5 |
| ... | ... | ... |

| USER AGE | | AP |
|---|---|---|
| | 30'S OR UNDER | −5P |
| | 40'S | 0P |
| | 50'S | +5P |
| | 60'S OR OVER | +10P |

605

| IS USER PHYSICALLY DISABLED OR NOT | | DP |
|---|---|---|
| | NOT PHYSICALLY DISABLED | 0P |
| | PHYSICALLY DISABLED | +10P |

610

| DEGREE OF PREFERENCE OF NON-CONTACT CHARGING TO CONTACT CHARGING | | PP |
|---|---|---|
| | PREFER CONTACT CHARGING | −5P |
| | PREFER NON-CONTACT CHARGING EQUALLY WITH CONTACT CHARGING | 0P |
| | RELATIVELY PREFER NON-CONTACT CHARGING | +5P |
| | PREFER NON-CONTACT CHARGING VERY MUCH | +10P |

615

602

X = AP + DP + PP    (X : NON-CONTACT CHARGING RECOMMENDATION DEGREE)

| DISTANCE LVE FROM VEHICLE TO CHARGING EQUIPMENT | | Y |
|---|---|---|
| | LESS THAN L1 | +10P |
| | L1 OR GREATER AND LESS THAN L2 | 0P |
| | L2 OR GREATER | −10P |

620

(Y : TEMPORAL RECOMMENDATION DEGREE)

Z = X + Y      (Z : TOTAL RECOMMENDATION DEGREE)

INFORMATION PROCESSING APPARATUS AND INFORMATION PROCESSING SYSTEM

CROSS-REFERENCE TO RELATED APPLICATION

This application claims priority to Japanese Patent Application No. 2021-190164 filed on Nov. 24, 2021, incorporated herein by reference in its entirety.

BACKGROUND

1. Technical Field

The present disclosure relates to an information processing apparatus and an information processing system.

2. Description of Related Art

Japanese Unexamined Patent Application Publication No. 2013-26953 discloses a vehicle with an electric power storage device mounted therein and a charging station. The charging station is configured to charge an electric power storage device of a vehicle through an electric power supply cable (charging cable).

SUMMARY

Techniques for suggesting charging equipment for charging an electric power storage device of a vehicle to a user of the vehicle have been known. As stated above, when charging equipment charges an electric power storage device of a vehicle through a charging cable, a user needs to manually connect the charging cable to the vehicle. However, in some cases, for example, the user may have difficulty in performing such manual work or may be unwilling to do such work. In such case, suggesting such type of charging equipment to the user is unfavorable.

The present disclosure has been made in order to solve the aforementioned problem, and an object of the present disclosure is to provide an information processing apparatus and an information processing system for suggesting charging equipment appropriate to a characteristic of a user to the user.

An information processing apparatus of the present disclosure is an information processing apparatus for suggesting first charging equipment or second charging equipment to a user of a vehicle in which an electric power storage device is mounted. The first charging equipment is configured to charge the electric power storage device via a contact charging method using a charging cable. The second charging equipment is configured to charge the electric power storage device via a non-contact charging method that is different from the contact charging method. The information processing apparatus includes a determination section and a setting section. The determination section determines a non-contact charging recommendation degree representing a degree of recommendation of the non-contact charging method to the user, based on a characteristic of the user. The setting section sets suggested equipment that is charging equipment to be suggested to the user, of the first charging equipment and the second charging equipment. When the non-contact charging recommendation degree is high, the setting section is more likely to set the second charging equipment as the suggested equipment than when the non-contact charging recommendation degree is low.

According to the above configuration, a non-contact charging recommendation degree is determined based on a characteristic of a user. As the non-contact charging recommendation degree is higher, that is, as the user has more characteristics for which the non-contact charging method is recommended, the second charging equipment is more likely to be suggested to the user. Therefore, it is possible to suggest charging equipment appropriate to a characteristic of a user to the user.

The information processing apparatus may further include an input section that receives an input of profile information of the user. The non-contact charging recommendation degree may be determined according to the profile information.

According to the above configuration, profile information of a user is reflected in the non-contact charging recommendation degree. As a result, it is possible to suggest appropriate charging equipment in which profile information of a user is reflected to the user.

The profile information may include a user age that is an age of the user. The characteristic of the user may include the user age input through the input section. The determination section may determine the non-contact charging recommendation degree such that when the user age is high, the non-contact charging recommendation degree becomes higher than that when the user age is low.

Typically, it is conceivable that as an age of a user is higher, the user has more difficulty in manually connecting a charging cable to a vehicle. According to the above configuration, as an age of a user is higher, the second charging equipment is more likely to be suggested to the user. As a result, it is possible to suggest appropriate charging equipment in which an age of a user is reflected to the user.

The profile information may include a preference degree representing a degree of the user preferring the non-contact charging method to the contact charging method. The characteristic of the user may include the preference degree input through the input section. The determination section may determine the non-contact charging recommendation degree such that when the preference degree is high, the non-contact charging recommendation degree becomes higher than that when the preference degree is low.

According to the above configuration, as a user's degree of preference of the non-contact charging method is higher, the second charging equipment is more likely to be suggested to the user. As a result, it is possible to suggest appropriate charging equipment in which a user's degree of preference is reflected to the user.

The information processing apparatus may further include an acquisition section and an estimation section. The acquisition section acquires a user image generated by an imaging device that takes an image of the user. The estimation section estimates a user age that is an age of the user, according to the user image. The characteristic of the user may include the user age estimated by the estimation section. The determination section may determine the non-contact charging recommendation degree such that when the user age is high, the non-contact charging recommendation degree becomes higher than that when the user age is low.

Typically, it is conceivable that as the age is higher, manual connection of a charging cable to a vehicle becomes more difficult. According to the above configuration, a non-contact charging recommendation degree is appropriately determined with no need for a user to perform operation for determining the non-contact charging recommendation degree. As a result, it is possible to suggest appropriate charging equipment in which an age of a user is reflected to the user while enhancing convenience for the user.

The information processing apparatus may further include a calculation section and a temporal recommendation degree determination section. For each of the first charging equipment and the second charging equipment, the calculation section calculates a total recommendation degree representing a degree of recommendation of the charging equipment to the user. The temporal recommendation degree determination section determines a temporal recommendation degree representing a degree of shortness of estimated travel time that is an estimated value of time required until the vehicle arrives at the second charging equipment. The temporal recommendation degree determination section may determine the temporal recommendation degree such that the temporal recommendation degree becomes higher as the estimated travel time is shorter. The total recommendation degree of the second charging equipment may include the non-contact charging recommendation degree and the temporal recommendation degree. The setting section may set charging equipment, the total recommendation degree of the charging equipment being higher, of the first charging equipment and the second charging equipment, as the suggested equipment.

According to the above configuration, in addition to a non-contact charging recommendation degree, estimated travel time such as that mentioned above is reflected in setting of suggested equipment. As a result, it is possible to suggest more appropriate charging equipment to a user.

An information processing system of the present disclosure is an information processing system for suggesting first charging equipment or second charging equipment to a user of a vehicle in which an electric power storage device is mounted. The first charging equipment is configured to charge the electric power storage device via a contact charging method using a charging cable. The second charging equipment is configured to charge the electric power storage device via a non-contact charging method that is different from the contact charging method. The information processing system includes a determination section, a setting section, and a notification section. The determination section determines a non-contact charging recommendation degree representing a degree of recommendation of the non-contact charging method to the user, based on a characteristic of the user. The setting section sets suggested equipment that is charging equipment to be suggested to the user, of the first charging equipment and the second charging equipment. The notification section notifies the user of the suggested equipment. When the non-contact charging recommendation degree is high, the setting section is more likely to set the second charging equipment as the suggested equipment than when the non-contact charging recommendation degree is low.

The present disclosure enables suggesting charging equipment appropriate to a characteristic of a user to the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram specifically illustrating an example of charging equipment information DB;

FIG. 7 is a diagram for describing an example of data to be used for determination of a non-contact charging recommendation degree and a temporal recommendation degree and calculation of a total recommendation degree;

DETAILED DESCRIPTION OF EMBODIMENTS

Figure 1:
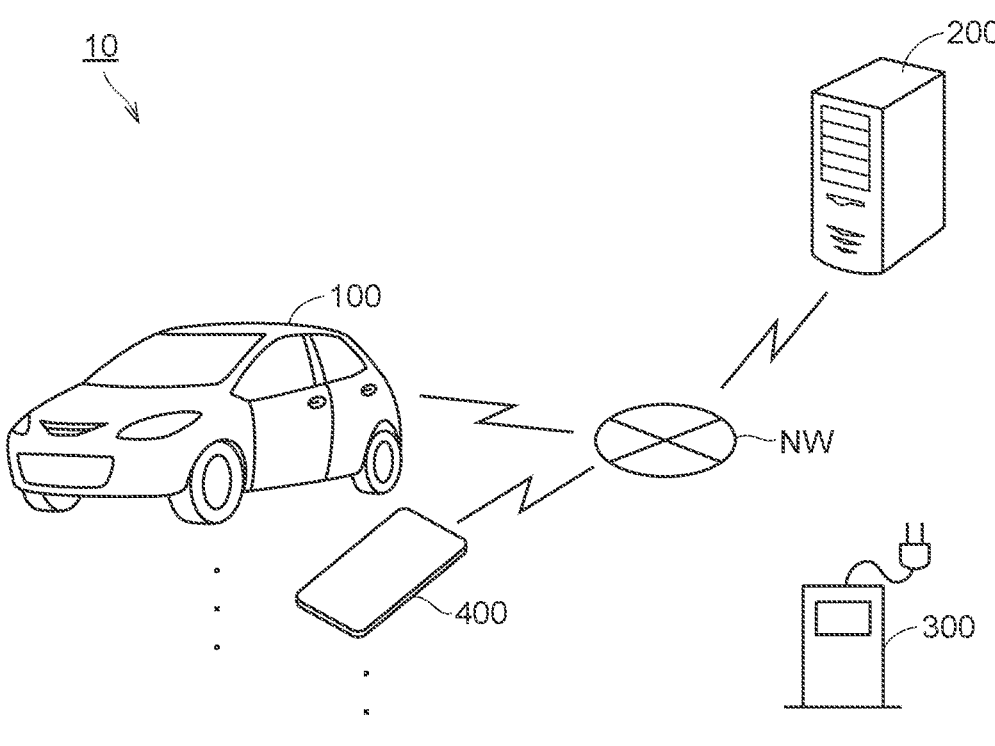
FIG. 1 is a diagram schematically illustrating an overall configuration of an information processing system including a server, which is an information processing apparatus according to a first embodiment.

Embodiments of the present disclosure will be described in detail below with reference to the drawings. In the drawings, parts that identical or correspond to each other are provided with the same sign and description of such part will not be repeated.

First Embodiment

FIG. 1 is a diagram schematically illustrating an overall configuration of an information processing system including a server, which is an information processing apparatus according to a first embodiment.

The information processing system 10 includes vehicles 100, a server 200, and user terminals 400. The vehicles 100, the server 200, and the user terminals 400 are connected to a communication network NW such as the Internet.

Each vehicle 100 is an electrified vehicle in which an electric power storage device for traveling is mounted, for example, a battery electric vehicle (BEV). Each vehicle 100 is configured to be capable of performing external charging for charging the electric power storage device using charging equipment such as a charging station 300 provided outside the vehicle 100.

The server 200 is configured to communicate with the vehicles 100 through the communication network NW.

Each user terminal 400 is a mobile terminal to be operated by a user of a vehicle 100, for example, a smartphone, a tablet terminal or a wearable terminal. The user can input a destination of the vehicle 100 by operating the user terminal 400.

Figure 2:
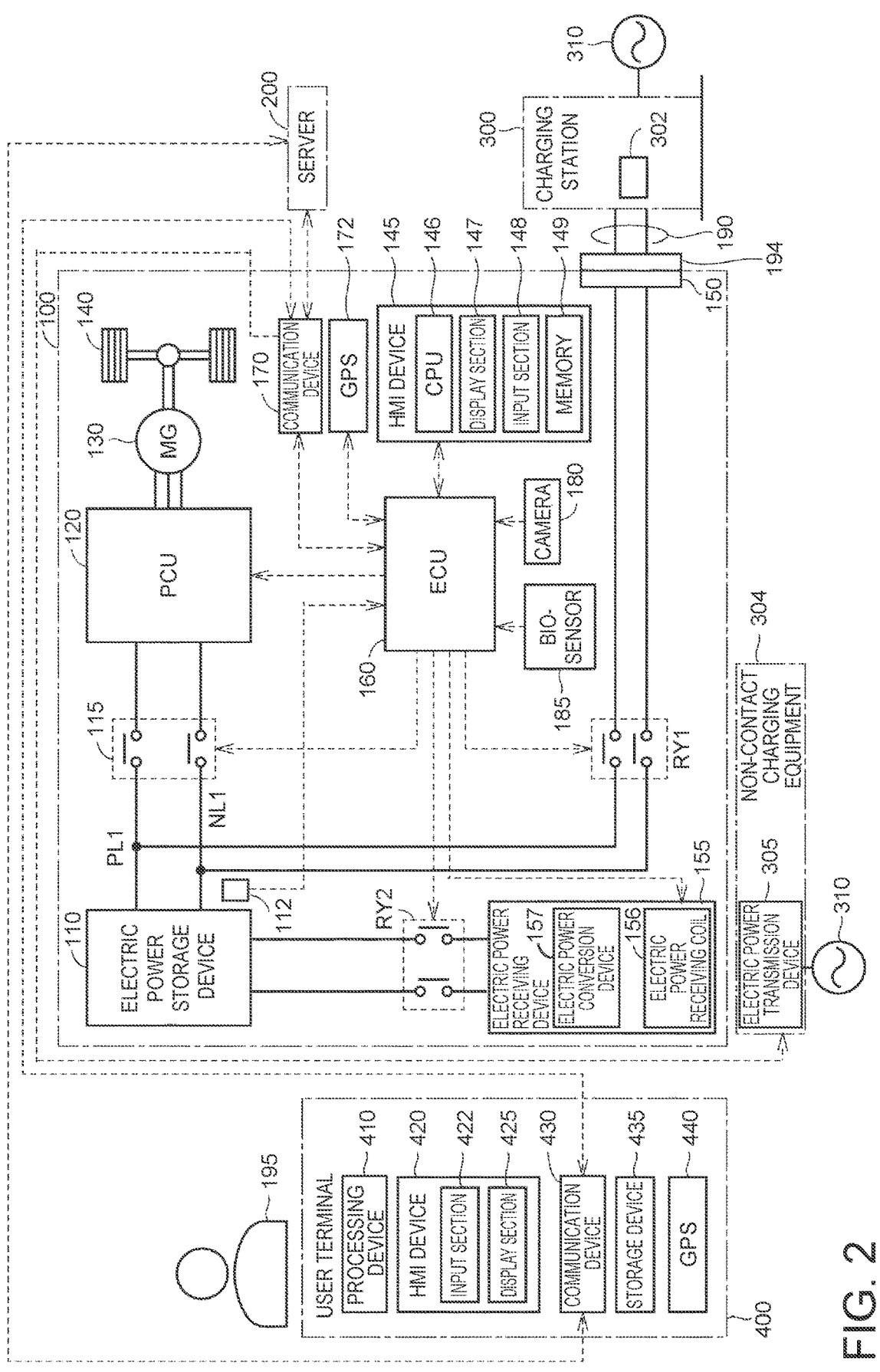
FIG. 2 is a diagram specifically illustrating respective configurations of a vehicle, a charging station, and a user terminal.

FIG. 2 is a diagram specifically illustrating respective configurations of a vehicle 100, a charging station 300, and a user terminal 400.

Referring to FIG. 2, the vehicle 100 includes an electric power storage device 110, a sensor unit 112, a system main relay (SMR) 115, a power control unit (PCU) 120, a motor generator (MG) 130, and drive wheels 140. The vehicle 100 further includes an inlet 150, charging relays RY1, RY2, a communication device (data communication module) 170, an electric power receiving device 155, and a human machine interface (HMI) device 145. The vehicle 100 includes a Global Positioning System (GPS) receiver 172, a camera 180, a biosensor 185, and an electronic control unit (ECU) 160.

The electric power storage device 110 is, for example, a secondary battery such as a lithium-ion battery. An amount of electric power stored in the electric power storage device 110 is indicated by a state of charge (SOC).

The sensor unit 112 includes a voltage sensor, an electric current sensor, and a temperature sensor that detect a voltage, an electric current, and a temperature of the electric power storage device 110, respectively.

The SMR 115 is provided between electric power lines PL1, NL1 connected to the electric power storage device 110, and the PCU 120. The SMR 115 is controlled to be on during the vehicle 100 traveling.

The PCU 120 includes electric power conversion devices such as converters and inverters (all not illustrated). The PCU 120 converts direct-current electric power received from the electric power storage device 110 into alternating-current electric power.

Upon reception of the alternating-current electric power resulting from the conversion by the PCU 120, the MG 130 generates a rotary drive force. The drive force generated by the MG 130 is transmitted to the drive wheels 140. Consequently, the vehicle 100 travels.

The inlet 150 is configured to receive electric power supplied from a grid power supply 310 through the charging station 300. Hereinafter, external charging of the vehicle 100, the external charging being performed using electric power supplied from the charging station 300 to the inlet 150, is also referred to as "contact charging".

The charging relay RY1 is connected to the electric power lines PL1, NL1. During performance of the contact charging, the charging relay RY1 is controlled to be in a closed state.

The communication device 170 is configured to enable bidirectional data communication to be performed between the vehicle 100 and the server 200 and between the vehicle 100 and the user terminal 400 through the communication network NW. The communication device 170 is configured to further enable near-field communication with non-contact charging equipment 304 (described later).

The electric power receiving device 155 includes an electric power receiving coil 156 and an electric power conversion device 157. The electric power receiving coil 156 receives alternating-current electric power in a non-contact manner from the grid power supply 310 through the non-contact charging equipment 304. The electric power conversion device 157 converts the alternating-current electric power received in a non-contact manner by the electric power receiving coil 156 into direct-current electric power of a voltage level of the electric power storage device 110. Hereinafter, external charging of the vehicle 100, the external charging being performed using electric power supplied from the non-contact charging equipment 304 to the electric power receiving device 155, is also referred to as "non-contact charging". Where the non-contact charging equipment 304 is provided on a driving lane (charging lane) or a side wall thereof, the vehicle 100 can perform non-contact charging during driving (charging during driving).

The charging relay RY2 is provided between the electric power storage device 110 and the electric power receiving device 155. The charging relay RY2 is controlled to be in a closed state during non-contact charging being performed.

The HMI device 145 is a touch screen that provides various kinds of information to a user 195 of the vehicle 100 and that receives an input provided via operation by the user 195. The HMI device 145 includes a display section 147, an input section 148, a memory 149, and a central processing unit (CPU) 146. The display section 147 displays various kinds of information to the user 195 of the vehicle 100.

The input section 148 receives an input provided via operation by the user 195. For example, the input section 148 receives an input of profile information of the user 195 or an input of a destination of the vehicle 100.

The memory 149 stores programs and data for implementing various functions, in the HMI device 145. The CPU 146 executes or uses the programs and data stored in the memory 149. Consequently, the HMI device 145 can function as, for example, a car navigation device. In this case, when the user 195 sets a destination of the vehicle 100 using the input section 148, information indicating the destination is transferred to the ECU 160 and then transmitted to the server 200 through the communication device 170. Subsequently, a driving route from a current location of the vehicle 100 to the destination is set by the server 200. Information indicating the driving route is transmitted from the server 200 to the vehicle 100. The display section 147 displays the driving route of the vehicle 100.

The GPS receiver 172 acquires position information indicating a current position of the vehicle 100, based on radio waves from an artificial satellite. The position information is transferred to the ECU 160 and then is used by the HMI device 145 or transmitted to the server 200 through the communication device 170.

The camera 180 is an imaging device that generates a user image by taking an image of the user 195 in the vehicle. The camera 180 outputs the user image to the ECU 160.

The biosensor 185 detects biological information such as a body temperature, a heart rate, a pulse rate, and a blood pressure of the user 195 in the vehicle, for example, in a non-contact manner and outputs a detection value of the detection to the ECU 160. The biological information may be information that is different from the body temperature, the heart rate, the pulse rate, and the blood pressure of the user 195.

The ECU 160 controls devices of the vehicle 100 according to various sensor signals, and the programs, the data, and maps stored in the memory. The ECU 160 controls, for example, the SMR 115, the PCU 120, the charging relays RY1, RY2, the HMI device 145, the electric power receiving device 155, and the communication device 170.

The ECU 160 calculates an SOC of the electric power storage device 110 using a known method according to the detection value from the sensor unit 112.

The ECU 160 is configured to perform external charging control for charging the electric power storage device 110 using charging equipment such as the charging station 300 or the non-contact charging equipment 304. Hereinafter, external charging control using electric power supplied from the charging station 300 to the inlet 150 is also referred to as "contact charging control". External charging control using electric power supplied from the non-contact charging equipment 304 to the electric power receiving device 155 is also referred to as "non-contact charging control".

Where the ECU 160 performs, for example, contact charging control, the ECU 160 transmits a charging start request and a charging current instruction value to the charging station 300 via controller area network (CAN) communication such that electric power is supplied from the charging station 300 to the inlet 150. Consequently, contact charging is performed.

Where the ECU 160 performs non-contact charging control, the ECU 160 outputs an electric power supply request to the non-contact charging equipment 304 via near-field communication through the communication device 170 such that electric power is supplied from the non-contact charging equipment 304 to the electric power receiving device 155. Consequently, electric power is supplied from an electric power transmission device 305 of the non-contact charging equipment 304 to the electric power receiving device 155. As a result, non-contact charging is started.

The charging station 300 includes a charging device 302. The charging device 302 converts alternating-current electric power from the grid power supply 310 into direct-current electric power during contact charging. The electric power resulting from the conversion is supplied to the inlet 150 through a charging cable 190 and a connector 194 of the charging station 300. Typically, a charging rate of the charging station 300 is higher than a charging rate of the non-contact charging equipment 304.

The user terminal 400 includes an HMI device 420, a communication device 430, a storage device 435, a GPS receiver 440, and a processing device 410.

The HMI device 420 is a touch screen and includes an input section 422 and a display section 425. The input section 422 receives an input provided by the user 195 (for example, an input of profile information and an input of a destination). The display section 147 displays various kinds of information to the user 195 of the vehicle 100.

As with the HMI device 145, the HMI device 420 can function as a car navigation device. The HMI device 420 is used for suggesting charging equipment pieces such as the charging station 300 and the non-contact charging equipment 304 to the user 195 by means of notification.

The communication device 430 is an interface for wirelessly communicating with the vehicle 100 and the server 200.

The storage device 435 stores programs and data to be used by the processing device 410 or the HMI device 420. The GPS receiver 440 acquires position information indicating a current position of the user terminal 400 from an artificial satellite.

The processing device 410 performs processing for controlling devices of the user terminal 400 according to the programs and the data stored in the storage device 435 and information input to the HMI device 420. For example, where the user 195 inputs profile information and a destination of the vehicle 100 to the HMI device 420, the processing device 410 transmits information indicating the profile information and the destination to the server 200 through the communication device 430.

Figure 3:
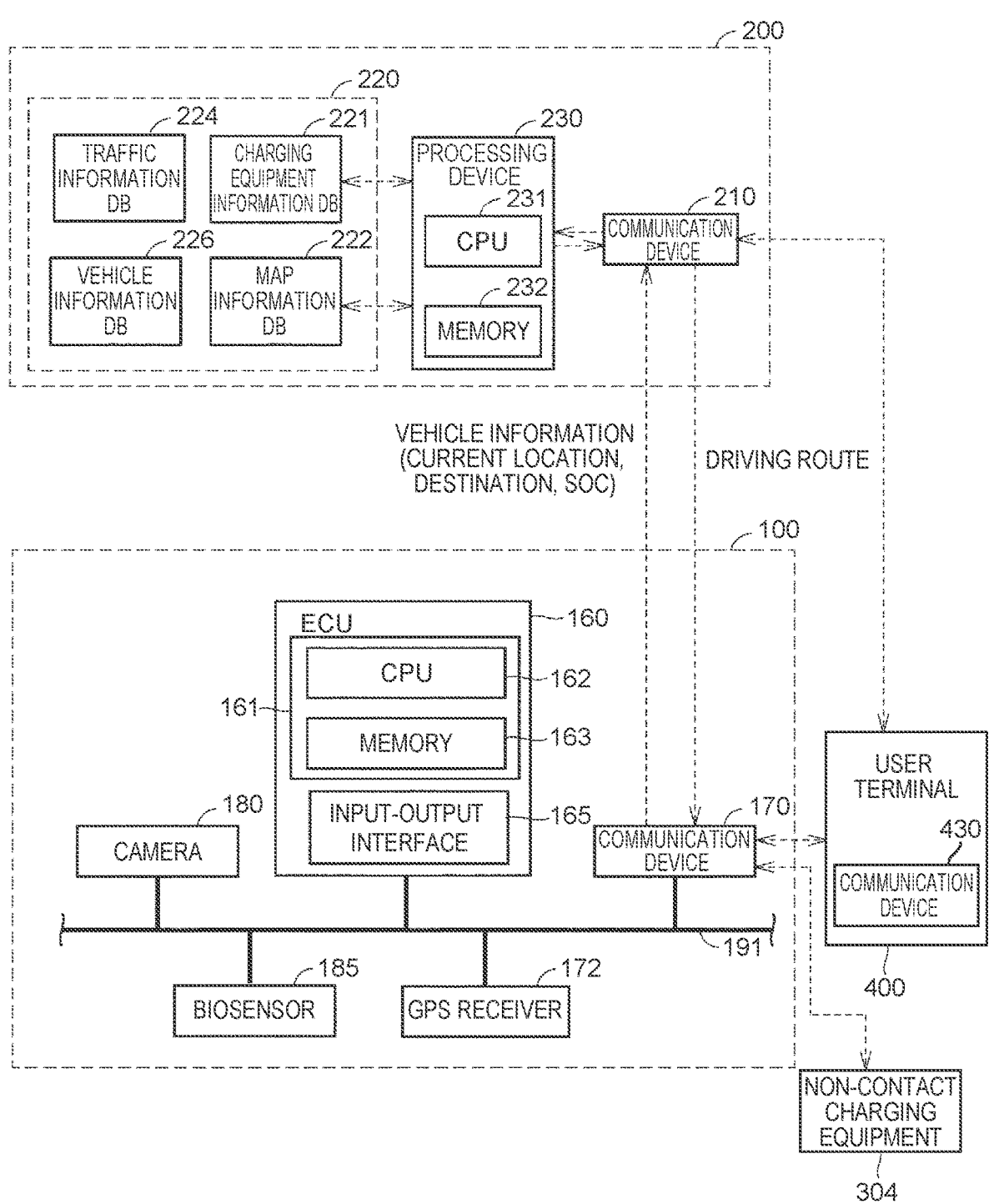
FIG. 3 is a diagram specifically illustrating an ECU and related devices in the vehicle and a configuration of the server.

FIG. 3 is a diagram specifically illustrating the ECU 160 and related devices in the vehicle 100 and a configuration of the server 200.

Referring to FIG. 3, the ECU 160 of the vehicle 100 includes a processing section 161 and an input-output interface 165. The processing section 161 includes a CPU 162 and a memory 163. The memory 163 includes a read-only memory (ROM) and a random-access memory (RAM) (neither of which is illustrated).

The ECU 160, the communication device 170, the GPS receiver 172, the camera 180, and the biosensor 185 are connected to an in-vehicle network (bus) 191.

The ECU 160 transmits and receives various kinds of information to or from the server 200, the user terminal 400, and the non-contact charging equipment 304 through the communication device 170. For example, the ECU 160 transmits vehicle information including various kinds of information of the vehicle 100 to the server 200 through the communication device 170. The vehicle information includes a current location of the vehicle 100, a destination of the vehicle 100, and a current SOC of the electric power storage device 110.

The server 200 includes a communication device 210, a storage device 220, and a processing device 230. The communication device 210 is configured to be communicable with the vehicle 100 and the user terminal 400. For example, the communication device 210 acquires (receives) the aforementioned vehicle information from the vehicle 100. Where the user 195 is in the vehicle 100, a position of the user terminal 400 and a position of the vehicle 100 are the same, and thus, the communication device 210 may acquire information of the position of the user terminal 40 and destination information of the vehicle 100 from the user terminal 400. The communication device 210 transmits a driving route of the vehicle 100, the driving route being set by the processing device 230, to the vehicle 100 or the user terminal 400.

The storage device 220 includes a map information database (DB) 222, a traffic information database (DB) 224, a vehicle information database (DB) 226, and a charging equipment information database (DB) 221.

The map information DB 222 stores map information including road map data. The traffic information DB 224 sores real-time data and history records of information indicating an amount of traffic on each of the roads in the map information DB 222, according to information transmitted from each of a large number of vehicles including the vehicles 100 (a position, a speed, etc., of the vehicle). The vehicle information DB 226 includes information including an ID and electricity consumption of each vehicle 100. The charging equipment information DB 221 stores information of a large number of charging equipment pieces.

FIG. 4 specifically illustrates an example of the charging equipment information DB 221. Referring to FIG. 4, the charging equipment information DB 221 indicates an ID, a charging method, and a position of each of the charging equipment pieces.

Referring to FIG. 2 again, where contact charging of the vehicle 100 is performed using the charging station 300, the user 195 needs to manually connect the charging cable 190 to the inlet 150. However, if the user 195 is an elderly person or is physically disabled, the user 195 has difficulty in doing such work. Otherwise, regardless of whether it is such case or not, the user 195 may be unwilling to do such work. Therefore, where charging of the electric power storage device 110 is needed, it may be unfavorable to suggest a contact charging-type charging station 300 to the user 195.

The server 200 according to the first embodiment includes a configuration that responds to the aforementioned problem. More specifically, the server 200 determines a non-contact charging recommendation degree representing a degree of recommendation of non-contact charging to the user 195, based on a characteristic of the user. The server 200 sets suggested equipment, which is charging equipment suggested to the user 195 from among the charging station 300 and the non-contact charging equipment 304. Where the non-contact charging recommendation degree is high, the server 200 is more likely to set the non-contact charging equipment 304 as the suggested equipment, than where the non-contact charging recommendation degree is low.

According to the above configuration, the non-contact charging recommendation degree is determined based on a characteristic of the user 195. As the non-contact charging recommendation degree is higher, that is, as the user 195 has more characteristics for which non-contact charging is recommended more, the non-contact charging equipment 304 is more likely to be suggested to the user 195, in preference to the charging station 300. Therefore, it is possible to suggest charging equipment appropriate to the characteristics of the user 195 to the user 195.

In the first embodiment, the non-contact charging recommendation degree is determined according to the profile information of the user 195. Consequently, the profile information of the user 195 is reflected in a non-contact charging recommendation degree X. As a result, it is possible to suggest appropriate charging equipment in which the profile information of the user 195 is reflected, to the user. A detailed description will be given below with reference to FIGS. 5 to 9.

Figure 5:
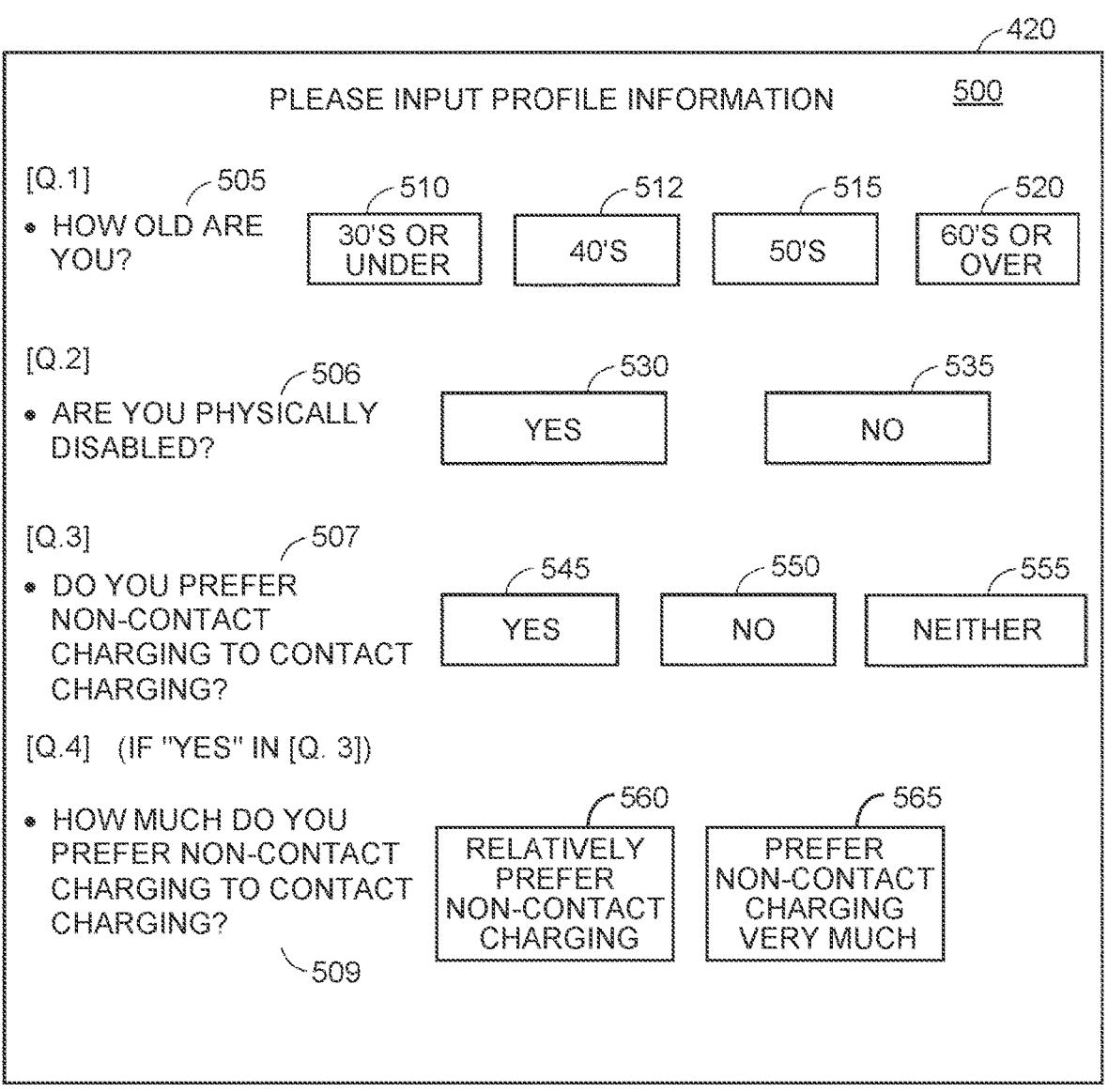
FIG. 5 is a diagram illustrating an example of a screen displayed on an HMI device of the user terminal.

FIG. 5 is a diagram illustrating an example of a screen displayed on the HMI device 420 of the user terminal 400. Referring to FIG. 5, a screen 500 is displayed to, for example, when the user 195 buys the vehicle 100, receive an input of profile information of the user 195. Upon the screen 500 being displayed, the profile information is input to the user terminal 400 through the input section 422 of the HMI device 420.

The screen 500 includes messages 505 to 509 and buttons 510 to 565. The message 505 asks the user 195 about a user age, which is an age of the user 195. The message 506 asks the user 195 about whether or not the user 195 is physically disabled. The message 507 asks the user 195 about whether or not the user 195 prefers non-contact charging to contact charging. The message 509 asks the user 195 about a degree of preference of non-contact charging. The degree of preference indicates the user 195's degree of preference of non-contact charging to contact charging.

Upon any of the buttons 510 to 565 being selected, an answer corresponding to the selected button is input to the user terminal 400 through the input section 422 of the HMI device 420. For example, upon the button 510 being selected, information indicating the age of the user 195 is in 30's or under is input to the user terminal 400.

Upon respective answers to the messages 505 to 509 being input, information indicating these answers (more specifically, answers about the user age, whether or not the user 195 is physically disabled, and the degree of preference) is stored as profile information in the storage device 435 of the user terminal 400. The information may be transmitted from the user terminal 400 to the server 200 and stored in the storage device 220 of the server 200.

Figure 6:
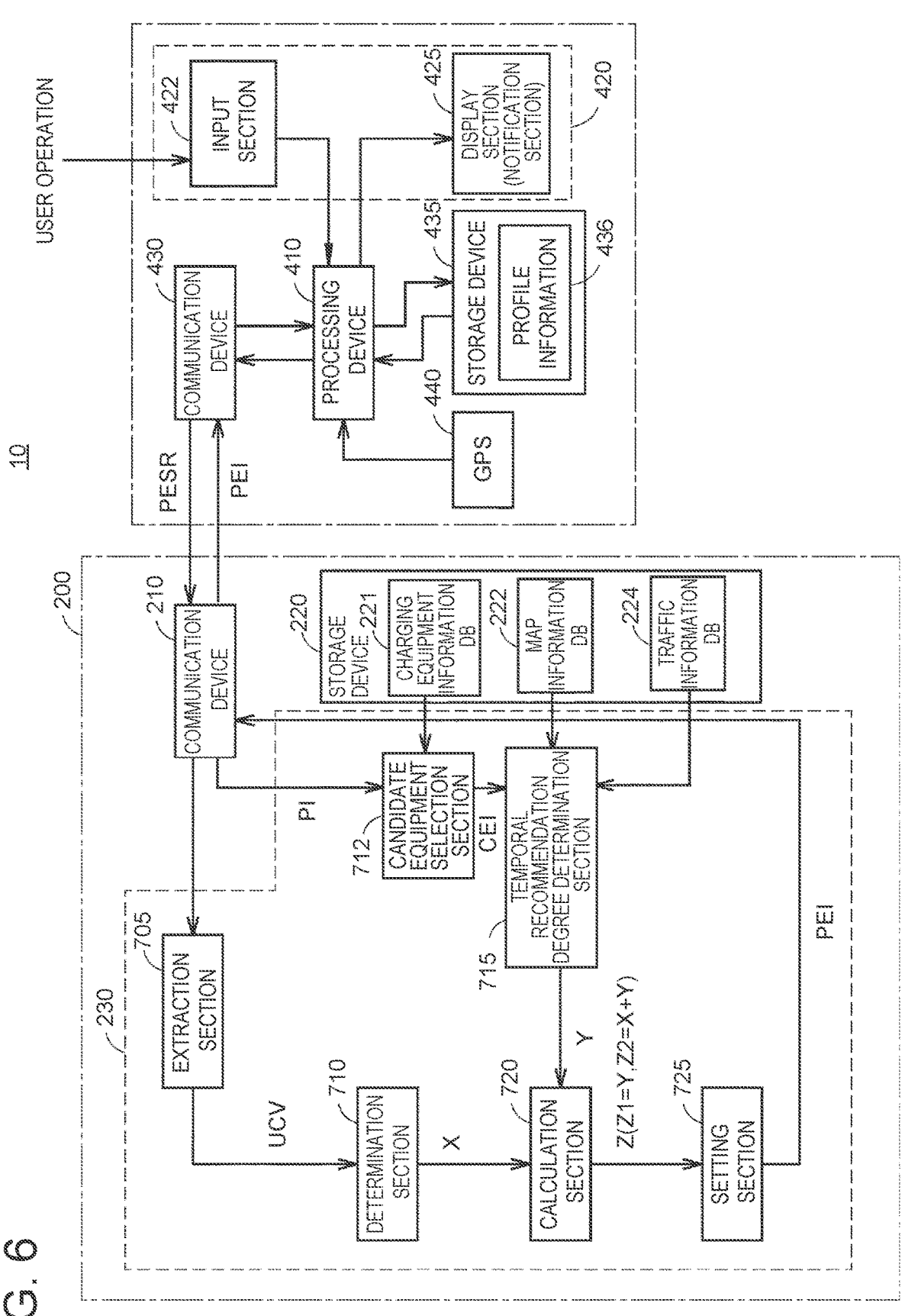
FIG. 6 is a block diagram for describing a function of the server and operation of the user terminal according to the first embodiment.

FIG. 6 is a block diagram for describing a function of the server 200 according to the first embodiment and operation of the user terminal 400. In this example, it is assumed that the user 195 is in the vehicle 100, carrying the user terminal 400, and provides an input indicating that the user wishes suggestion of charging equipment, via the user's operation.

Referring to FIG. 6, in response to the above input provided via the user's operation, the processing device 410 acquires position information of the user terminal 400 (equal to position information of the vehicle 100 in this example) from the GPS receiver 440. Furthermore, the processing device 410 reads profile information 436 of the user 195 from the storage device 435. Subsequently, in order to set suggested equipment such as described above, the processing device 410 outputs a request (suggested equipment setting request PESR) to the server 200 through the communication device 430. This request includes the read profile information 436 and the position information of the user terminal 400.

The communication device 210 of the server 200 receives the suggested equipment setting request PESR from the user terminal 400. The received suggested equipment setting request PESR is transferred to the processing device 230.

The processing device 230 includes an extraction section 705, a determination section 710, a candidate equipment selection section 712, a temporal recommendation degree determination section 715, a calculation section 720, and a setting section 725 as functional components.

The extraction section 705 extracts a user characteristic value UCV from the profile information included in the suggested equipment setting request PESR received by the communication device 210. The user characteristic value UCV represents a characteristic of the user 195 and includes, for example, at least one of the user age and the degree of preference of non-contact charging. The user characteristic value UCV may further include information indicating whether or not the user 195 is physically disabled. The user characteristic value UCV is output to the determination section 710.

The determination section 710 determines a non-contact charging recommendation degree X based on the user characteristic value UCV. The determination section 710 determines the non-contact charging recommendation degree X such that where the user characteristic value UCV is high, the non-contact charging recommendation degree X becomes higher than that where the user characteristic value UCV is low. In this example, the non-contact charging recommendation degree X is determined such that where at least one of the user characteristic values of the user age and the degree of preference of non-contact charging is high, the non-contact charging recommendation degree X becomes higher than that where the at least one of the user characteristic values is low. The non-contact charging recommendation degree X is output to the calculation section 720. A specific method for determining the non-contact charging recommendation degree X will be described later.

The candidate equipment selection section 712 selects a plurality of candidate equipment pieces, which are candidates of suggested equipment, from among a plurality of charging equipment pieces each having an ID stored in the charging equipment information DB 221 (FIG. 4). The candidate equipment pieces are selected from charging equipment pieces located within a range of a predetermined distance from a current position of the vehicle 100. The candidate equipment pieces may be selected from equipment pieces located along a driving route the vehicle 100 drives to arrive at a destination. The candidate equipment selection section 712 selects the candidate equipment pieces according to position information PI of the user terminal 400 (current position of the vehicle 100) included in the suggested equipment setting request PESR and respective positions of the charging equipment pieces in the charging equipment information DB 221 (FIG. 4). Candidate equipment information CEI indicating the candidate equipment pieces (for example, the IDs of the candidate equipment pieces) is output to the temporal recommendation degree determination section 715.

The temporal recommendation degree determination section 715 calculates a temporal recommendation degree Y for each candidate equipment piece, according to the candidate equipment information CEI. The temporal recommendation degree Y represents a degree of shortness of estimated travel time, which is an estimated value of time required until the vehicle 100 arrives at charging equipment such as the charging station 300 or the non-contact charging equipment 304. The temporal recommendation degree determination section 715 calculates the temporal recommendation degree Y for each candidate equipment piece, by calculating estimated travel time for the candidate equipment piece according to the map information DB 222 and the traffic information DB 224. It is also conceivable that as the estimated travel time of travel to a charging equipment piece is shorter, the use of the charging equipment piece by the user 195 is recommended more. Therefore, the temporal recommendation degree determination section 715 determines the temporal recommendation degree Y such that as the estimated travel time is shorter, the temporal recommendation degree Y becomes higher. A relationship between the temporal recommendation degree Y and the estimated travel time is represented by, for example, a predetermined arithmetic expression. The temporal recommendation degree Y is output to the calculation section 720. A specific method for determining a temporal recommendation degree Y will be described later.

For each of the charging station 300 and the non-contact charging equipment 304, the calculation section 720 calculates a total recommendation degree Z representing a degree of recommendation of the charging equipment to the user 195. In other words, the calculation section 720 calculates the total recommendation degree Z for each candidate equipment piece. The calculation section 720 may calculate the total recommendation degree Z for each of three or more charging equipment pieces (candidate equipment pieces) including the charging station 300 and the non-contact charging equipment 304. In this example, the total recommendation degree Z (total recommendation degree Z1) of the charging station 300 is equal to the relevant temporal recommendation degree Y. The total recommendation degree Z (total recommendation degree Z2) of the non-contact charging equipment 304 includes the non-contact charging recommendation degree X and the relevant temporal recommendation degree Y, and in this example, is a total of these recommendation degrees. A specific method for calculating the total recommendation degree Z will be described later. The total recommendation degrees Z1, Z2 are output to the setting section 725.

The setting section 725 sets charging equipment having a higher total recommendation degree Z, of the charging station 300 and the non-contact charging equipment 304, as suggested equipment. For example, where one charging station 300 and one non-contact charging equipment 304 are selected as candidate equipment pieces and the total recommendation degree Z2 of the non-contact charging equipment 304 is higher than the total recommendation degree Z1 of the charging station 300, the setting section 725 sets the non-contact charging equipment 304 as suggested equipment. Upon the suggested equipment being set according to the total recommendation degree Z in this way, the aforementioned estimated travel time is reflected in setting of the suggested equipment in addition to the non-contact charging recommendation degree X. As a result, it is possible to suggest more appropriate charging equipment to the user.

Where a total recommendation degree Z is calculated for each of three or more charging equipment pieces (candidate equipment pieces) including the charging station 300 and the non-contact charging equipment 304, the setting section 725 may set a charging equipment piece having a highest total recommendation degree Z from among the three or more charging equipment pieces, as suggested equipment. The number of suggested equipment pieces may be one or two or more. Suggested equipment information PEI indicating at least one suggested equipment piece (for example, the ID of the suggested equipment piece) is output to the communication device 210.

Subsequently, the suggested equipment information PEI is transmitted from the communication device 210 to the user terminal 400. Upon reception of the suggested equipment information PEI through the communication device 430, the processing device 410 of the user terminal 400 displays a screen showing information indicating the suggested equipment (for example, the position of the suggested equipment), on the display section 425. Consequently, where notification of the suggested equipment is provided to the user 195. Where the HMI device 420 includes a microphone, the processing device 410 may provide the notification of the suggested equipment to the user 195 via voice output from the microphone. The HMI device 420 forms an example of "notification section" of the present disclosure.

FIG. 7 is a diagram for describing an example of data to be used for determination of a non-contact charging recommendation degree X and a temporal recommendation degree Y and calculation of a total recommendation degree Z. The below description will be provided appropriately with reference to FIG. 5.

Referring to FIG. 7, total recommendation degree calculation data 600 is stored in the memory 232 of the processing device 230. The total recommendation degree calculation data 600 includes non-contact charging recommendation degree determination data 602 and temporal recommendation degree determination data 620.

The non-contact charging recommendation degree determination data 602 is used for determination of a non-contact charging recommendation degree X. The non-contact charging recommendation degree determination data 602 include data 605 to 615.

The data 605 is used for determination of an age point AP for determining a non-contact charging recommendation degree X. The determination section 710 determines an age point AP according to a result of selection from the buttons 510, 512, 515, 520 in FIG. 5 and the data 605.

For example, if the button 510 is selected, the user age is in 30's or under, and thus, it is conceivable that the user 195 can easily manually connect the charging cable 190 to the inlet 150. In this example, in order for the charging station 300, which typically has a higher charging rate, to be more likely to be recommended to the user 195 than the non-contact charging equipment 304, the age point AP is determined to be low (−5P).

If the button 512 is selected, the user age is in 40's, and thus, it is conceivable that the user 195 can perform the work of connecting the charging cable 190 with no trouble. In this example, in order for the non-contact charging equipment 304 and the charging station 300 to be equally likely to be recommended to the user 195, the age point AP is determined not to change (0P).

Where the button 515 is selected, the user age is in 50's, and thus, it is conceivable that the user 195 relatively exhausts himself/herself in the work of connecting the charging cable 190. In this example, in order for the non-contact charging equipment 304 to be relatively likely to be recommended to the user 195 than the charging station 300, the age point AP is determined to be relatively high (+5P).

If the button 520 is selected, the user age is in 60's or over, it is conceivable that the user 195 exhausts himself/herself in the work of connecting the charging cable 190. In this example, in order for the non-contact charging equipment 304 to be more likely to be recommended to the user 195 than the charging station 300, the age point AP is determined to be high (+10P).

The data 610 is used for determination of a disability point DP for determining a non-contact charging recommendation degree X. The determination section 710 determines a disability point DP based on a result of selection from the buttons 530, 535 and the data 610.

For example, if the button 530 is selected, the user 195 is not physically disabled. In this example, in order for the non-contact charging equipment 304 and the charging station 300 to be equally likely to be recommended to the user 195, the disability point DP is determined not to change (0P).

If the button 535 is selected, the user 195 is physically disabled, and thus, it is conceivable that the user 195 has difficulty in performing the work of connecting the charging cable 190. In this example, in order for the non-contact charging equipment 304 to be more likely to be recommended to the user 195 than the charging station 300, the disability point DP is determined to be high (+10P).

The data 615 is used for determination of a preference point PP for determining a non-contact charging recommendation degree X. The preference point PP corresponds to a form of a degree of preference of non-contact charging. The determination section 710 determines an age point AP according to a result of selection from the buttons 545, 550, 555 in FIG. 5 (and if the button 545 is selected, subsequent selection from the buttons 560, 565) and the data 615.

For example, if the button 545 is selected, the user 195 prefers contact charging to non-contact charging, and thus, the preference point PP is determined to be low (−5P).

If the button 555 is selected, the user 195 prefers contact charging equally with non-contact charging, and thus, the preference point PP is determined not to change (0P).

If the buttons 545, 560 are selected, the user 195 relatively prefers non-contact charging to contact charging, and thus, the preference point PP is determined to be relatively high (5P).

If the buttons 545, 565 are selected, the user 195 prefers non-contact charging to contact charging very much, and thus, the preference point PP is determined to be high (10P).

The determination section 710 determines a non-contact charging recommendation degree X according to the age point AP, the disability point DP and the preference point PP. In this example, the non-contact charging recommendation degree X is a total of these points. Note that the above points (−5P, 0P, +5P, +10P) are mere examples and are not limited to these examples.

Typically, it is conceivable that as the age of the user 195 is higher, the user 195 has more difficulty in manually connecting the charging cable 190 to the inlet 150. Where the non-contact charging recommendation degree X is determined as above, as the age of the user age is higher, the non-contact charging equipment 304 is more likely to be determined as the suggested equipment because the age point AP is higher. As a result, it is possible to suggest appropriate charging equipment in which the user age is reflected to the user.

Furthermore, the non-contact charging equipment 304 is more likely to be suggested to the user 195 as the user 195's degree of preference (preference point PP) of non-contact charging is higher. As a result, it is possible to suggest appropriate charging equipment in which the user 195's preference is reflected to the user.

The temporal recommendation degree determination data 620 is used for determination of a temporal recommendation degree Y. The temporal recommendation degree determination section 715 determines a temporal recommendation degree Y according to a distance LVE from the vehicle 100 (user terminal 400) to charging equipment (candidate equipment) and the temporal recommendation degree determination data 620.

For example, if the distance LVE is shorter than a distance L1, it is conceivable that estimated travel time of travel to the charging equipment is shorter than that where the distance LVE is not shorter than the distance L1, and thus, the temporal recommendation degree Y is determined to be high (+10P).

If the distance LVE is not shorter than the distance L1 and is shorter than the distance L2 (>L1), it is conceivable that the estimated travel time is shorter than that where the distance LVE is not shorter than the distance L2 and the estimated travel time is longer than that where the distance LVE is shorter than the distance L1. In this example, the temporal recommendation degree Y is determined not to change (0P).

Where the distance LVE is not shorter than the distance L2, it is conceivable that the estimated travel time is longer than that where the distance LVE is shorter than the distance L2, the temporal recommendation degree Y is determined to be low (−10P). The distances L1 and L2 are appropriately determined in advance.

Figure 8:
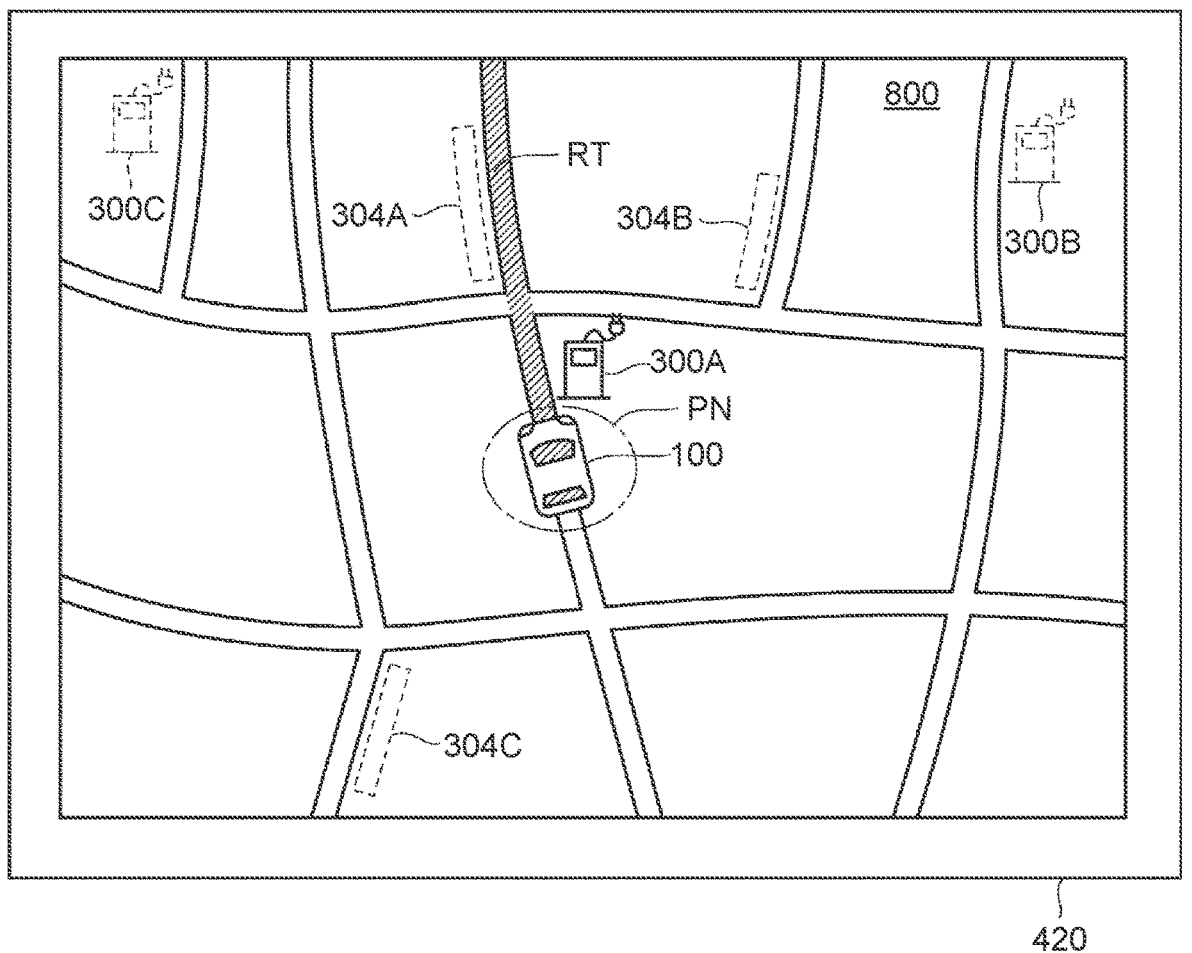
FIG. 8 is a diagram illustrating an example of a navigation screen displayed on an HMI device of a user terminal in a comparative example.

FIG. 8 is a diagram illustrating an example of a navigation screen displayed on an HMI device 420 of a user terminal 400 in a comparative example.

Referring to FIG. 8, a navigation screen 800 in the comparative example displays a map within a range of a predetermined distance from a current location PN of a vehicle 100. Furthermore, the navigation screen 800 displays a charging station 300A from among charging stations 300A to 300C and non-contact charging equipment pieces 304A to 304C around the vehicle 100, the charging station 300A being located along a driving route (hatched part) RT of the vehicle 100 and being charging equipment closest to the current location PN of the vehicle 100. Each of the charging stations 300A to 300C is the same as the charging station 300. Each of the non-contact charging equipment pieces 304A to 304C is the same as the non-contact charging equipment 304 and is provided on a side wall of a road, for charging during the vehicle 100 traveling. In this example, charging equipment pieces (charging stations 300B, 300C and non-contact charging equipment pieces 304A to 304C) other than the charging station 300A are actually located around the current location PN of the vehicle 100 but are not displayed on the navigation screen 800.

In the comparative example, even if a user 195 has difficulty in connecting a charging cable 190 to an inlet 150 or is unwilling to do such work, the charging station 300A is suggested to the user 195. As a result, inappropriate charging equipment may be suggested to the user 195.

Figure 9:
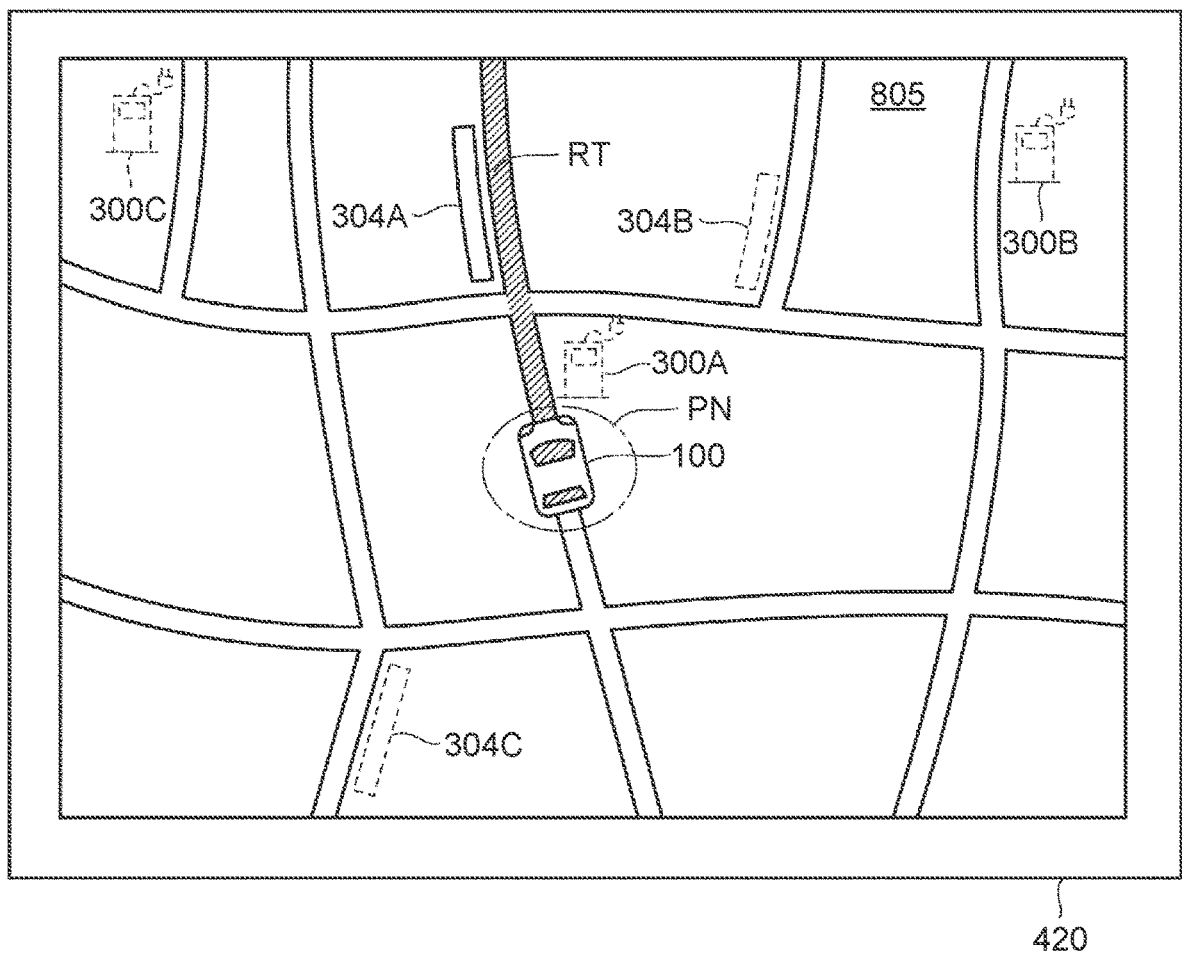
FIG. 9 is a diagram illustrating an example of a navigation screen displayed on an HMI device of the user terminal in the first embodiment.

FIG. 9 is a diagram illustrating an example of a navigation screen displayed on the HMI device 420 of the user terminal 400 in the first embodiment.

Referring to FIG. 9, in the first embodiment, a total recommendation degree Z is calculated by the server 20 for each of non-contact charging equipment pieces 304A to 304C and charging stations 300A to 300C, which are candidate equipment pieces. In this example, it is assumed that the total recommendation degree Z of the non-contact charging equipment 304A from among these candidate equipment pieces is highest. Therefore, the non-contact charging equipment 304A is set as suggested equipment and suggested equipment information PEI indicating the setting result is transmitted from the server 200 to the user terminal 400.

Upon reception of the suggested equipment information PEI, the user terminal 400 displays a navigation screen 805 on the display section 425 of the HMI device 420. Unlike the navigation screen 800 in the comparative example, the navigation screen 805 displays the non-contact charging equipment 304A. If both of total recommendation degrees Z2 of the non-contact charging equipment pieces 304B, 304C are higher than all of total recommendation degrees Z1 of the charging stations 300A to 300C, the navigation screen 805 may further display the non-contact charging equipment pieces 304B, 304C.

In the first embodiment, if the user 195 has difficulty in connecting the charging cable 190 to the inlet 150 or is unwilling to do such work, the non-contact charging equipment 304 can be suggested to the user 195 instead of the contact charging-type charging station 300. As a result, it is possible to suggest appropriate charging equipment to the user 195.

Figure 10:
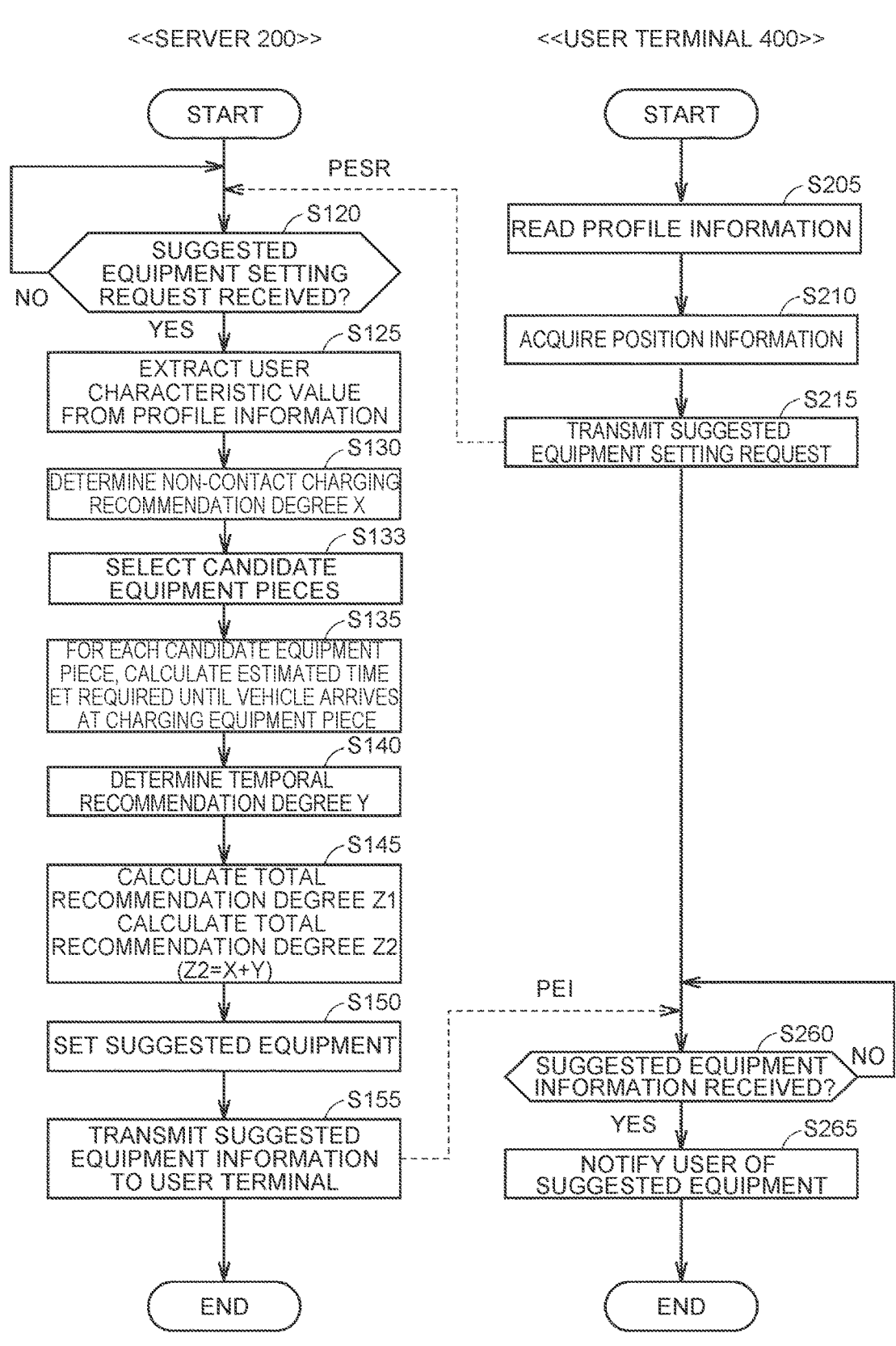
FIG. 10 is a flowchart illustrating an example of processing to be executed for notification of suggested equipment to a user in the first embodiment.

FIG. 10 is a flowchart illustrating an example of processing to be executed for notification of suggested equipment to the user 195 in the first embodiment. The processing in this flowchart starts, for example, upon the user 195 inputting an instruction indicating a wish for charging equipment to be suggested, to the user terminal 400.

Referring to FIG. 10, the user terminal 400 reads the profile information 436 of the user 195 from the storage device 435 (step S205).

Next, the user terminal 400 acquires position information of the user terminal 400, using the GPS receiver 440 (step S210). In this example, the position of the user terminal 400 is equal to a position of the vehicle 100.

Next, the user terminal 400 transmits a suggested equipment setting request PESR to the server 200 (step S215). This request includes the read profile information 436 and the position information of the user terminal 400 (position information of the vehicle 100).

The server 200 determines whether or not the server 200 has received the suggested equipment setting request PESR (step S120). If the server 200 has not received this request (NO in step S120), the server 200 performs the determination processing until the server 200 receives this request. On the other hand, if the server 200 has received this request (YES in step S120), the server 200 proceeds the processing to step S125.

Next, the server 200 extracts a user characteristic value UCV (for example, at least one of a user age and a degree of preference of non-contact charging) from the profile information included in the received suggested equipment setting request PESR (step S125). The server 200 determines a non-contact charging recommendation degree X based on the user characteristic value UCV and the non-contact charging recommendation degree determination data 602 (FIG. 7) (step S130).

Next, the server 200 selects a plurality of candidate equipment pieces, which are candidates for suggested equipment, based on the charging equipment information DB 221 (FIGS. 4 and 6) (step S133). The server 200 calculates estimated travel time ET, which is an estimated value of time required until the vehicle 100 arrives at the charging equipment (candidate equipment), for each candidate equipment piece (step S135) and determines a temporal recommendation degree Y for each candidate equipment piece (step S140).

Next, the server 200 calculates a total recommendation degree Z for each candidate equipment piece. More specifically, for each of the charging stations 300 included in the candidate equipment pieces, the server 200 calculates a total recommendation degree Z1 of the charging station 300, and for each of the non-contact charging equipment pieces 304 included in the candidate equipment pieces, the server 200 calculates a total recommendation degree Z2 of the non-contact charging equipment piece 304 (step S145). In this example, the total recommendation degree Z2 is a total of the non-contact charging recommendation degree X and the temporal recommendation degree Y.

Next, the server 200 sets a charging equipment piece having a highest total recommendation degree Z from among the plurality of candidate equipment pieces including the charging stations 300 and the non-contact charging equipment pieces 304, as suggested equipment (step S150).

Next, the server 200 transmits suggested equipment information PEI to the user terminal 400 through the communication device 210 (step S155). After step S155, the processing in the server 200 ends.

The user terminal 400 determines whether or not the user terminal 400 has received the suggested equipment information PEI through the communication device 430 (step S260). If the user terminal 400 has not received the suggested equipment information PEI (NO in step S260), the user terminal 400 performs the determination processing until the user terminal 400 receives this information. On the other hand, the user terminal 400 has received the information (YES in step S260), the user terminal 400 proceeds the processing to step S265.

Next, the user terminal 400 notifies the user 195 of the suggested equipment according to the suggested equipment information PEI (step S265). More specifically, the user terminal 400 displays the screen 805 (FIG. 9) on the display section 425 or informs the user 195 of information indicating the suggested equipment, via voice. After step S265, the processing in the user terminal 400 ends.

Second Embodiment

In the second embodiment, a non-contact charging recommendation degree X is determined using a user image generated by a camera 180. More specifically, the non-contact charging recommendation degree X is determined according to a user age estimated using the user image.

A hardware configuration of an information processing system 10 in the second embodiment is similar to that of the information processing system 10 (FIGS. 1 to 3) in the first embodiment.

Figure 11:
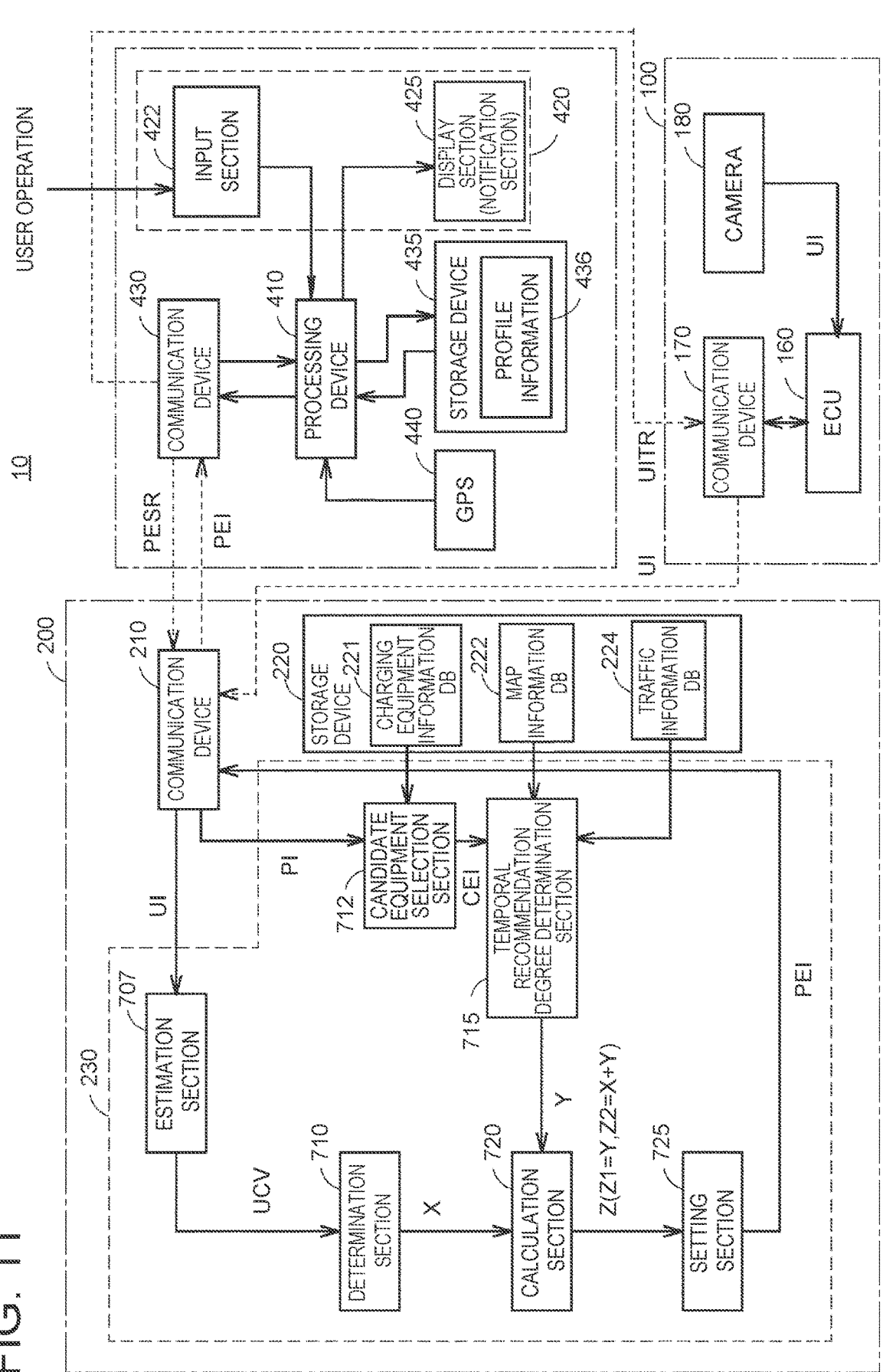
FIG. 11 is a block diagram for describing a function of a server and operation of a user terminal according to a second embodiment.

FIG. 11 is a block diagram for describing a function of a server 200 according to the second embodiment and operation of a user terminal 400.

Referring to FIG. 11, the block diagram is different from FIG. 6 in that a vehicle 100 with a camera 180 mounted therein is illustrated and in that a server 200 includes an estimation section 707 as a functional component instead of an extraction section 705. For the rest, the block diagram in FIG. 11 is basically similar to the block diagram in FIG. 6.

In response to an input provided via a user's operation, a processing device 410 transmits a suggested equipment setting request PESR to the server 200 and outputs a user image transmission request UITR to the vehicle 100 through a communication device 430. The user image transmission request UITR is output in order to make the vehicle 100 transmit a user image UI showing the user 195 in the vehicle to the server 200.

Upon reception of the user image transmission request UITR by a communication device 170 of the vehicle 100, an ECU 160 transmits a user image UI generated by the camera 180 to the server 200 through the communication device 170.

A communication device 210 of the server 200 acquires (receives) the suggested equipment setting request PESR from the user terminal 400 and the user image UI from the vehicle 100. The user image UI is transmitted to the estimation section 707.

The estimation section 707 estimates a user age according to the user image UI. More specifically, the estimation section 707 estimates a user age using the user image UI and a known image recognition technique. The estimation section 707 estimates the user age by, for example, recognizing the facial contour, the positional relationships among the eyes, the nose, and the mouth, and the color of the skin, of the user 195 in the user image UI.

Figure 12:
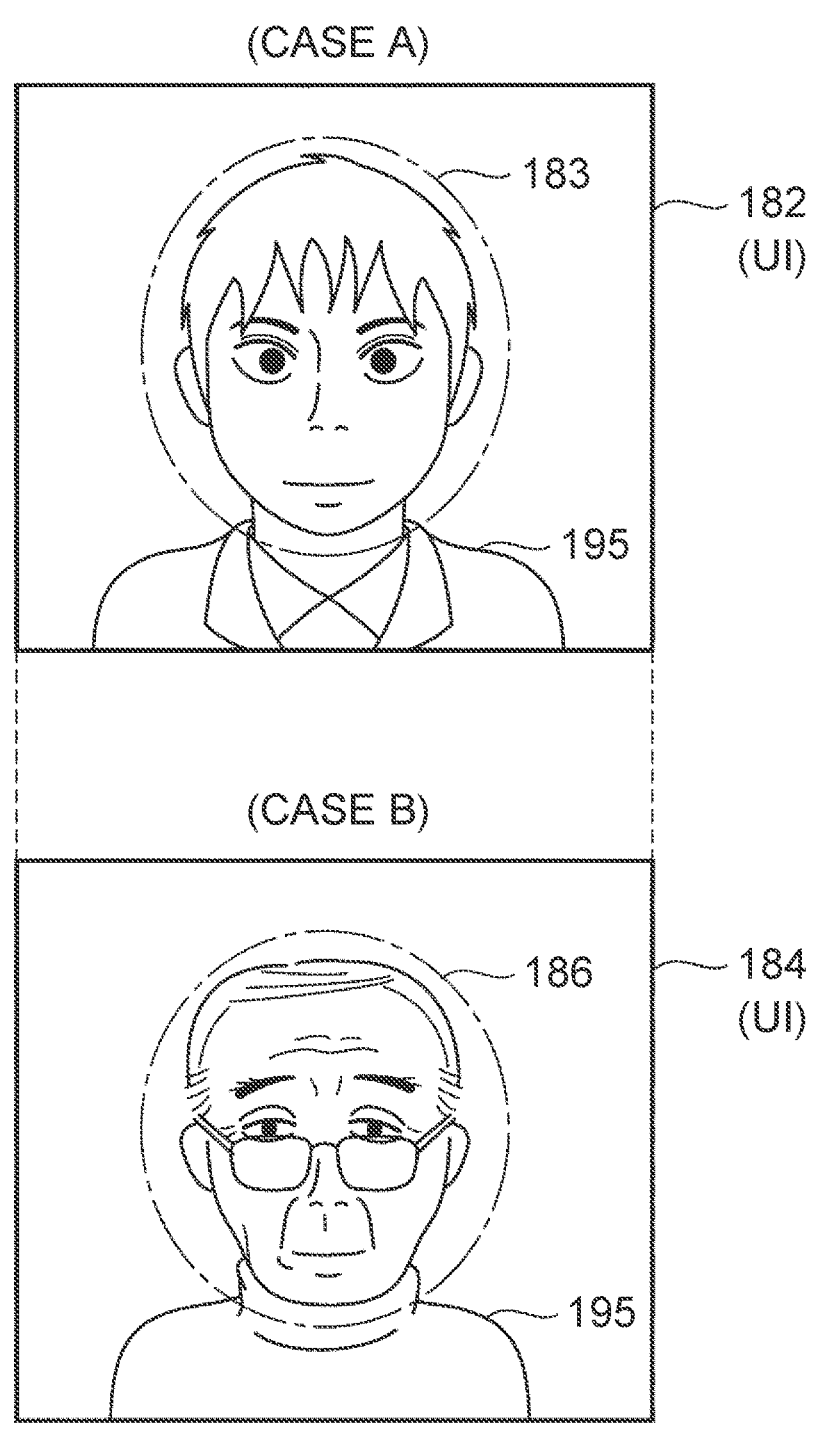
FIG. 12 is a diagram illustrating examples of user images generated by a camera.

FIG. 12 is a diagram illustrating an example of a user image UI generated by the camera 180. Referring to FIG. 12, where the user image UI is an image 182 (case A), the estimation section 707 extracts a partial image 183 showing the face of a user 195 from the image 182. The estimation section 707 estimates that the age of the user 195 is in 40's or under by employing a known image recognition technique (age estimation technique) for the partial image 183.

On the other hand, where the user image UI is an image 184 (case B), the estimation section 707 extracts a partial image 186 showing the face of a user 195 from the image 184. The estimation section 707 estimates that the age of the user 195 is in 60's or over by employing the known image recognition technique for the partial image 186.

Referring to FIG. 11 again, the user age estimated as above is output to the determination section 710 as a user characteristic value UCV. Where the estimated user age is high, the determination section 710 determines a non-contact charging recommendation degree X such that the non-contact charging recommendation degree X is higher than that where the user age is low.

In this way, in the second embodiment, a non-contact charging recommendation degree X is automatically and appropriately determined without requiring the user 195 to perform an age input operation for determining the non-contact charging recommendation degree X (selection from the buttons 510 to 520 in FIG. 5). As a result, it is possible to suggest appropriate charging equipment in which the user age is reflected to the user while enhancing convenience for the user 195.

Figure 13:
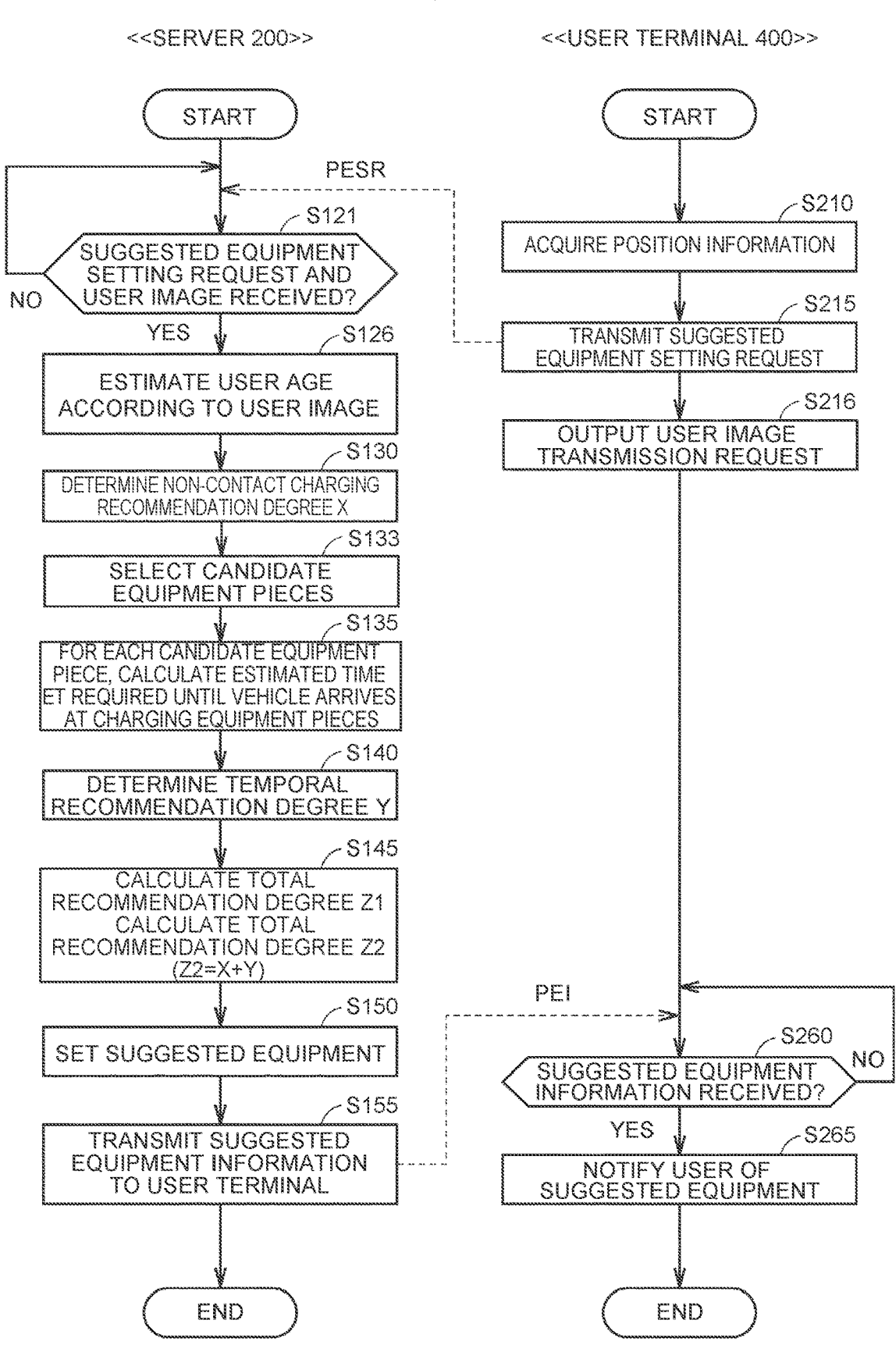
FIG. 13 is a flowchart illustrating an example of processing to be executed for notification of suggested equipment to a user in the second embodiment.

FIG. 13 is a flowchart illustrating an example of processing to be executed for notification of suggested equipment to the user 195 in the second embodiment.

Referring to FIG. 13, this flowchart is different from the flowchart in FIG. 10 in that the processing in step S216 is added and the processing in step S121 and the processing in step S126 are performed instead of the processing in step S120 and the processing in S125, respectively. For the rest, the flowchart in FIG. 13 is basically similar to the flowchart in FIG. 10.

The user terminal 400 transmits a suggested equipment setting request PESR to the server 200 (step S215) and outputs a user image transmission request UITR to the vehicle 100 (step S216). Consequently, a user image UI is transmitted from the vehicle 100 to the server 200.

The server 200 determines whether or not the server 200 has received the suggested equipment setting request PESR and the user image UI (step S121). If the server 200 has received neither the suggested equipment setting request PESR nor the user image UI (NO in step S121), the server 200 performs the determination processing until the server 200 receives the suggested equipment setting request PESR and the user image UI. On the other hand, if the server 200 has received the suggested equipment setting request PESR and the user image UI (YES in step S121), the server 200 proceeds the processing to step S126.

Next, the server 200 estimates the user age according to the user image UI (step S126). The estimated user age is used, as a user characteristic value UCV, for determination of a non-contact charging recommendation degree X in processing subsequent to step S126.

Third Embodiment

In a third embodiment, an unhealthiness degree representing a degree of unhealthiness of a user 195 is used as a user characteristic value UCV for determination of a non-contact charging recommendation degree X.

For determination of the unhealthiness degree, biological information (value detected by the biosensor 185 in FIG. 1) of the user 195 is successively transmitted from a relevant vehicle 100 to a server 200. The server 200 estimates an unhealthiness degree of the user 195 according to the biological information of the user 195. The server 200 determines the non-contact charging recommendation degree X such that as the unhealthiness degree is higher, the non-contact charging recommendation degree X becomes higher. A specific method for determining a non-contact charging recommendation degree X will be described below.

Note that a hardware configuration of an information processing system 10 in the third embodiment is similar to that of the information processing system 10 in the first embodiment (FIGS. 1 to 3).

Figure 14:
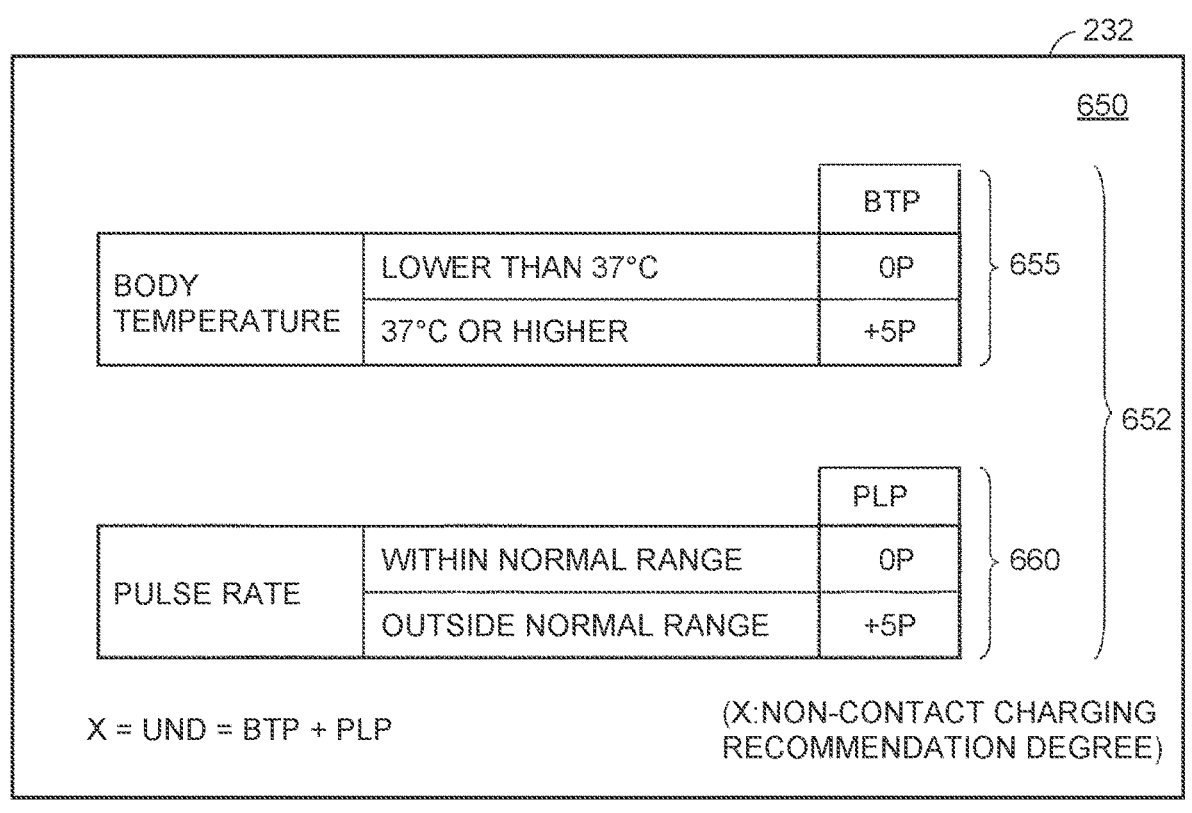
FIG. 14 is a diagram illustrating an example of data to be used for determination of non-contact charging recommendation degree in a third embodiment.

FIG. 14 is a diagram illustrating an example of data to be used for determination of a non-contact charging recommendation degree X in the third embodiment.

Referring to FIG. 14, non-contact charging recommendation degree determination data 650 is stored in a memory 232 of a processing device 230. The non-contact charging recommendation degree determination data 650 includes unhealthiness degree determination data 652. The unhealthiness degree determination data 652 includes data 655, 660.

The data 655 is used for determination of a body temperature point BTP for determining an unhealthiness degree UND. A determination section 710 determines a body temperature point BTP according to the value detected by the biosensor 185 and the data 655.

For example, if a body temperature of the user 195 is lower than 37° C., it is less likely that the user 195 has a cold. In this example, in order for non-contact charging equipment 304 and a charging station 300 to be equally likely to be recommended to the user 195, the body temperature point BTP is determined not to change (0P).

On the other hand, if the body temperature of the user 195 is not lower than 37° C., it is highly likely that the user 195 has a cold. Therefore, in order for the non-contact charging equipment 304, which does not require the user 195 to perform work of connecting a charging cable 190 at the time of use, to be suggested, the body temperature point BTP is determined to be high (+5P).

The data 660 is used for determination of a pulse rate point PLP for determining an unhealthiness degree UND. The determination section 710 determines a pulse rate point PLP based on the value detected by the biosensor 185 and the data 660.

For example, if a pulse rate of the user 195 falls within a normal range, it is conceivable from the perspective of the pulse rate that the user 195 has no health problem. In this example, in order for the non-contact charging equipment 304 and the charging station 300 to be equally likely to be recommended to the user 195, the pulse rate point PLP is determined to be low (0P). The pulse rate normal range is appropriately determined in advance through medical tests.

On the other hand, if the pulse rate of the user 195 falls outside the normal range, the user 195 may have a health problem. Therefore, in order for the non-contact charging equipment 304, which does not require the user 195 to perform work of connecting the charging cable 190 at the time of use, to be suggested, the pulse rate point PLP is determined to be high (+5P).

The determination section 710 determines an unhealthiness degree UND according to the body temperature point BTP and the pulse rate point PLP. In this example, the unhealthiness degree UND is a total of the body temperature point BTP and the pulse rate point PLP, but is not limited to the total of these points.

For example, the determination section 710 may further determine respective evaluation points for detected values of a heart rate and a blood pressure of the user 195, the detected values being output from the biosensor 185, and determine an unhealthiness degree UND such that these points are reflected in the unhealthiness degree UND in addition to the body temperature point BTP and the pulse rate point PLP.

The determination section 710 determines a non-contact charging recommendation degree X by determining an unhealthiness degree UND. In this example, the non-contact charging recommendation degree X is equal to the unhealthiness degree UND. The non-contact charging recommendation degree X may be determined according to at least one of the age point AP, the disability point DP, and the preference point PP (FIG. 7), which have been described above, and the unhealthiness degree UND. For example, the non-contact charging recommendation degree X may be a total of at least one of these points, and the unhealthiness degree UND.

The biosensor 185 may be configured to detect coughing by the user 195 (for example, coughing sounds). The detection result may be reflected in the unhealthiness degree UND. For example, if coughing by the user 195 is detected, the server 200 may determine the unhealthiness degree UND such that the unhealthiness degree UND is higher than that where coughing by the user 195 is not detected.

Other Alternations

The processing sequence (processing in steps S205 to S265) performed by the user terminal 400 in the flowchart in FIG. 10 may be performed by the ECU 160, the HMI device 145, and the communication device 170 of the vehicle 100. In this case, the processing sequence may automatically be started upon an SOC of the electric power storage device 110 decreasing to be lower than a threshold value during the vehicle 100 traveling. The profile information 436 is stored in the memory 149 of the HMI device 145 of the vehicle 100. The HMI device 145 of the vehicle 100 forms an example of "notification section" of the present disclosure.

The processing sequence (processing in steps S120 to S155) performed by the server 200 in the flowchart in FIG. 10 or FIG. 13 may be performed by the ECU 160 of the vehicle 100. In this case, the ECU 160 forms an example of "information processing apparatus" of the present disclosure.

More specifically, the respective functions of the extraction section 705, the estimation section 707, determination section 710, the candidate equipment selection section 712, the temporal recommendation degree determination section 715, the calculation section 720, and the setting section 725 (FIG. 6 or 11) are implemented by the processing section 161 of the ECU 160. In this case, a suggested equipment setting request PESR is transmitted from the user terminal 400 to the vehicle 100. The input-output interface 165 functions as an acquisition section that acquires a user image UI created by the camera 180 and the suggested equipment setting request PESR. Total recommendation degree calculation data 600 and non-contact charging recommendation degree determination data 650 are stored in the memory 163 of the ECU 160.

In the first and second embodiments, a charging equipment piece having a highest total recommendation degree Z from among candidate equipment pieces is set as suggested equipment. However, where a non-contact charging recommendation degree X is higher than a predetermined threshold recommendation degree, non-contact charging equipment 304 having the non-contact charging recommendation degree X may be set as suggested equipment.

Although in the first and second embodiments, as information indicating the current position of the vehicle 100, the position information of the user terminal 400 is used, position information acquired by the GPS receiver 172 of the vehicle 100 may be used.

In the first and second embodiments, a user image UI is created by the camera 180 mounted in the vehicle 100. However, where a camera is mounted in the user terminal 400, the camera may create a user image UI. In this case, the user image UI is transmitted from the user terminal 400 to the server 200 or a relevant vehicle 100.

What is claimed is:

1. An information processing apparatus for suggesting first charging equipment or second charging equipment to a user of a vehicle in which an electric power storage device is mounted, the first charging equipment being configured to charge the electric power storage device via a contact charging method using a charging cable, the second charging equipment being configured to charge the electric power storage device via a non-contact charging method that is different from the contact charging method, the information processing apparatus comprising:

a determination section that determines a non-contact charging recommendation degree representing a degree of recommendation of the non-contact charging method to the user, based on a characteristic of the user;

a setting section that sets suggested equipment that is charging equipment to be suggested to the user, of the first charging equipment and the second charging equipment, wherein when the non-contact charging recommendation degree is high, the setting section is more likely to set the second charging equipment as the suggested equipment than when the non-contact charging recommendation degree is low; and an input section that receives an input of profile information of the user, wherein:

the non-contact charging recommendation degree is determined according to the profile information, the profile information includes a user age that is an age of the user, the characteristic of the user includes the user age input through the input section, and the determination section determines the non-contact charging recommendation degree such that when the user age is high, the non-contact charging recommendation degree becomes higher than that when the user age is low.

2. The information processing apparatus according to claim 1, wherein:

the profile information includes a preference degree representing a degree of the user preferring the non-contact charging method to the contact charging method;

the characteristic of the user includes the preference degree input through the input section; and the determination section determines the non-contact charging recommendation degree such that when the preference degree is high, the non-contact charging recommendation degree becomes higher than that when the preference degree is low.

3. The information processing apparatus according to claim 1, further comprising:

an acquisition section that acquires a user image generated by an imaging device that takes an image of the user; and an estimation section that estimates a user age that is an age of the user, according to the user image, wherein the characteristic of the user includes the user age estimated by the estimation section, and the determination section determines the non-contact charging recommendation degree such that when the user age is high, the non-contact charging recommendation degree becomes higher than that when the user age is low.

4. The information processing apparatus according to claim 1, further comprising:

a calculation section that for each of the first charging equipment and the second charging equipment, calculates a total recommendation degree representing a degree of recommendation of the charging equipment to the user; and a temporal recommendation degree determination section that determines a temporal recommendation degree representing a degree of shortness of estimated travel time that is an estimated value of time required until the vehicle arrives at the second charging equipment, wherein the temporal recommendation degree determination section determines the temporal recommendation degree such that the temporal recommendation degree becomes higher as the estimated travel time is shorter, the total recommendation degree of the second charging equipment includes the non-contact charging recommendation degree and the temporal recommendation degree, and the setting section sets charging equipment, the total recommendation degree of the charging equipment being higher, of the first charging equipment and the second charging equipment, as the suggested equipment.

5. An information processing system for suggesting first charging equipment or second charging equipment to a user of a vehicle in which an electric power storage device is mounted, the first charging equipment being configured to charge the electric power storage device via a contact charging method using a charging cable, the second charging equipment being configured to charge the electric power storage device via a non-contact charging method that is different from the contact charging method, the information processing system comprising:

a determination section that determines a non-contact charging recommendation degree representing a degree of recommendation of the non-contact charging method to the user, based on a characteristic of the user;

a setting section that sets suggested equipment that is charging equipment to be suggested to the user, of the first charging equipment and the second charging equipment;

a notification section that notifies the user of the suggested equipment, wherein when the non-contact charging recommendation degree is high, the setting section is more likely to set the second charging equipment as the suggested equipment than when the non-contact charging recommendation degree is low; and an input section that receives an input of profile information of the user, wherein:

the non-contact charging recommendation degree is determined according to the profile information, the profile information includes a user age that is an age of the user, the characteristic of the user includes the user age input through the input section, and the determination section determines the non-contact charging recommendation degree such that when the user age is high, the non-contact charging recommendation degree becomes higher than that when the user age is low.

* * * * *